United States Patent [19]

Sasaki et al.

[11] Patent Number: 4,921,428
[45] Date of Patent: May 1, 1990

[54] CABLE REEL

[75] Inventors: Kunihiko Sasaki; Yuichi Ida; Tsumoru Oka; Mituaki Shinroaku, all of Miyagi, Japan

[73] Assignee: Alps Electric Co., Ltd., Tokyo, Japan

[21] Appl. No.: 301,914

[22] Filed: Jan. 25, 1989

[30] Foreign Application Priority Data

Mar. 31, 1988 [JP] Japan .............................. 63-42050[U]

[51] Int. Cl.$^5$ ............................................. H01R 39/02
[52] U.S. Cl. ........................................ 439/15; 439/164
[58] Field of Search .................................. 439/15, 164

[56] References Cited

U.S. PATENT DOCUMENTS 4,744,763   5/1988   Suzuki et al. .................. 439/164 X Primary Examiner—Eugene F. Desmond
Attorney, Agent, or Firm—Guy W. Shoup; David W. Heid

[57] ABSTRACT

A cable reel comprises the fixture, the mover operating in connection with the fixture, the flat cable wound through several times, in which the end of the flat cable is led out of the fixture passing through the mover, at least one sheets are adhesively attached to one surface of said fixture and said mover facing to both ends at the width direction of the flat cable.

8 Claims, 2 Drawing Sheets

CABLE REEL

BACKGROUND OF THE INVENTION

This invention relates to providing a cable reel for performing the electrical contact between the fixture and the mover using the flat cable, and particularly to providing a cable reel suitable for using in the steering of the automobile.

PRIOR ART

The cable reel is used in the automobile steering apparatus, in which flat cable is wound onto the mover or released therefrom so that the mover can be rotated with the predetermined amount, when the flat cable wound through several times is led out-wardly with one end being fixed to the fixture and other end fixed to the mover and rotated.

THE SUBJECT TO BE SOLVED BY THIS INVENTION

Then the flat cable as described above has the problems that since numerous conductor films are constructed by winding the stripper laminated with a pair of the flexible film, for example polyethylen teleptalate (PET), etc., both ends at the width direction of the flat cable are moved in contact with the inner surface of the fixture or the mover and occurs the undesirable friction sound, when the flat cable is wound into the mover or released therefrom. Also, if the cable reel is used under the environment, such as the automobile, on which the vibration is easily applied, the flat cable has the problem that both ends at it's width direction are encountered with the inner surface of the fixture and the mover and occurs the deafening roar.

This invention is devised in light of these problems in the prior art, and the object of the invention is to provide a cable reel for reducing the noise.

MEANS FOR RESOLVING THE SUBJECT

In order to accomplish the above object, this invention is characterized in that the sheet having the superior sliding function, such as 4-fluoro ethylen etc., is adhesively attached to at least one sliding surface of the fixture or the mover facing to both ends at the width direction of the flat cable.

ACTING EFFECT

As described above, if the high sliding sheet is attached to at least one sliding surface of the fixture or the mover, the undesirable noise is reduced because the flat cable is displaced in contact with the high sliding sheet, when the flat cable is wound into the mover or released therefrom. Also, even through the flat cable is displaced toward the axis direction of the mover by the vibration, the deafening roar occured by such a displacement is absorbed by the high sliding sheet and the adhesive agent attached to the sliding surface contacting therewith. Particularly, if the high sliding sheet is adhesively attached to said inner surface with the elastic sheet being inserted there-between, the effecting for killing the noise is very superior.

BRIEF DESCRIPTION OF THIS INVENTION

These object and features of the invention will be seen by reference to the description taken in connection with the accompanying drawings, in which :

FIG. 1 to FIG. 4 discloses the cable reel according to one embodiment of the invention.

Figure 1:
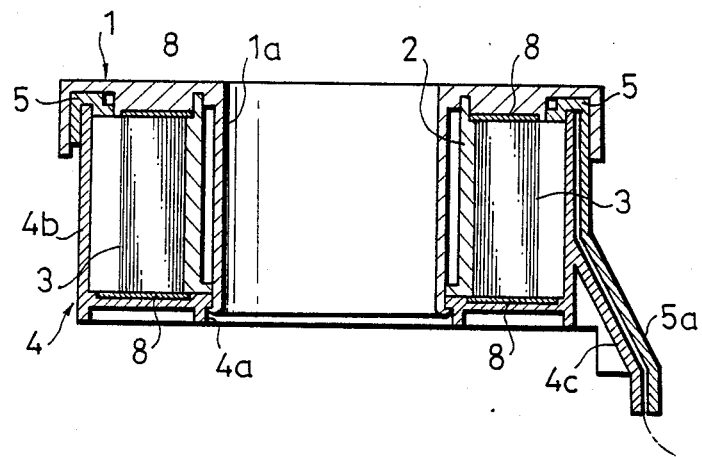
FIG. 1 is a longitudinal cross-sectional view of the cable reel.

The embodiment of this invention will be described below by reference to the drawings :

FIG. 1 is a longitudinal cross-sectional view of the cable reel according to one embodiment of this invention.

Figure 2:
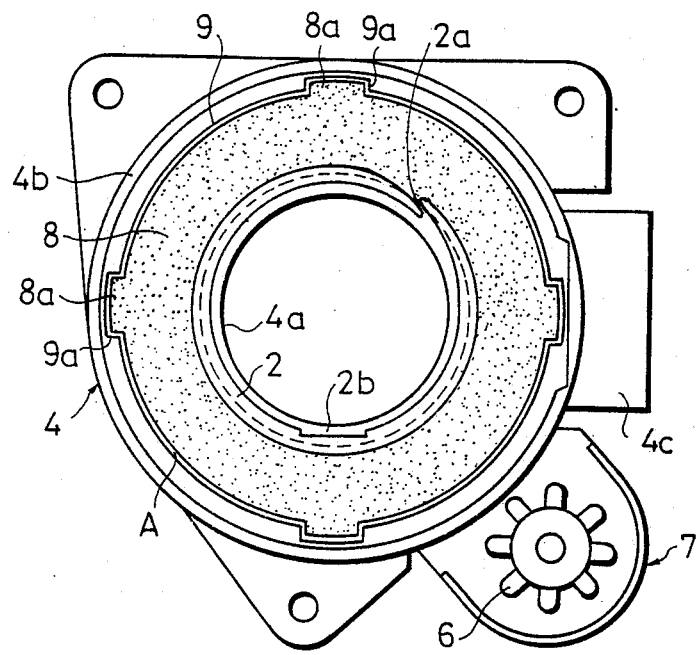
FIG. 2 is a plan view of the fixture.

FIG. 2 is a plan view of the fixture, with which the cable reel is provided. Mover 1 is provided with the rotating barrel 1a having the shaft inserting hole, which is vertically mounted at the center.

Cylindrical holder 2 is arranged on the outside of each of rotating barrel 1a. This holder 2 has slit 2a extending toward the upward and downward, and concaved portion 2 formed in parts of its inner periphery. Also holder 2 is inserted/ fixed into the upper plate of mover 1 so as to form the predetermined gap spacing from the outer periphery of rotating barrel 1a. Flat cable 3 is provided with a plurality of the conductor film laminated by a pair of the flexible film, such as PET, etc. The winding starting end of flat cable 3 reachs concaved portion 2b passing through slit 2a of holder 2, and then turned toward concaved portion 2b. Thereafter flat cable 3 is led out of mover 1.

On the other hand, fixture 4 has hole 4a at its center, which rotating barrel 1a of mover 1 is freely snapped. Outer wheel wall 4b receiving flat cable 3 is also mounted in the vertical on the outer periphery of fixture 4. Ring member 5 is mounted on the upper portion of outer wheel wall 4b. Mover 1 is rotated in contact with the periphery of ring member 5. Due to it, the grease mixed with the surface active agent having the insulating property such as 4-fluoro ethylene is deposited on the contacting surface, so that it helps to reduce the contacting sound occuring between mover 1 and ring member 5.

Also, guide portions 4c, 5a are projected toward the slanted lower side at the parts of fixture 4 and guide member 5. The wound end of flat cable 3 is turned toward the innerside of outer wheel wall 4, and then turned toward the inner surface of outer wheel wall 4, and led out of fixture 1 along both of guide portions 4c and 5a. The positioning mechanism 7 provided with teeth wheel 6 is mounted on fixture 1. Teeth wheel 6 is separately attached to the coupling projector installed at parts of the outer periphery in mover 1, so that mover 1 is rotated by the predetermined angle per one rotation of teeth wheel 6.

Each of sheets 8.8 having the high sliding property such as 4-fluoro ethylene is adhesively attached to the inner surface of the ceiling board of mover 1 and the inner lower surface of fixture 4. Both ends toward the width of flat cable 3 is faced against high sliding sheets 8.8. High sliding sheets 8.8 with respect to fixture 4 will be explained in detail below. On the inner periphery of fixture 4, concaved portion 9 provided with a plurity of projecting portion 9a around the outer periphery thereof is constructed in form of the step. High sliding sheets 8. having a plurality projecting portion 9a formed on the same periphery is adhesively attached in concaved portion 9 with projecting portions 8a and 9a being conrresponded to each other. At this case, the outer size of high sliding sheet 8 is the relative smaller as compared with that of concaved portion 9, and thereby the clearance A is formed between them, which is not a circular but a line of discontinuity having the concaving and convexing portions by forming projecting portions 8a and 9a. Also, high sliding sheet 8 on the side of mover 1 is constructed to have the configuration same as that of high sliding sheet 8 on fixture 4 herein the explanation in connection with high sliding sheet 8 of fixture 4 is omitted to avoid duplication.

Figure 3:
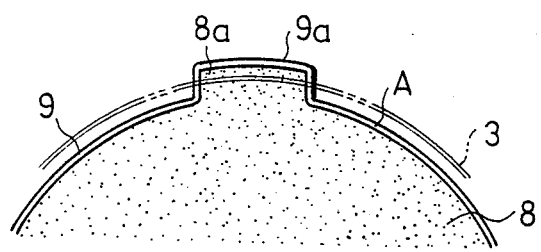
FIG. 3 is a plan view of the high sliding sheet.
Figure 4:
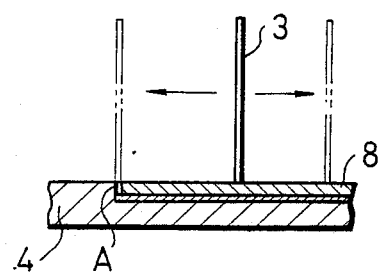
FIG. 4 is a cross-sectional view of the high sliding sheet.

The cable reel constructed according to one embodiment of this invention is used in various apparatus, specially the automobile, with mover 1 being fixed to the steering wheel of the steering shaft, respectively. And if the steering wheel(mover 1) is rotated toward one direction, flat cable 3 is wound into holder 2 of mover 1. On the contrary, if the steering wheel is rotated toward other direction, flat cable 3 is rewound into outer wheel wall 4 of fixture 4. Therefore during the operation of the winding, the electrical contact between mover 1 and fixture 4 is maintained through flat cable 3. At this case, since both ends at the width direction of flat cable 3 is displaced toward the diameter of mover 1 (or fixture 4) in contact with high sliding sheets 8.8 as shown in FIG. 4, the contacting sound of flat cable 3 is redused, while the torque of mover 1 is reduced. Particularly, in the outer periphery of mover 1 and fixture 4 flat cable 3 passes across clearance A, formed between high sliding sheet 8 and concaved portion 9 as shown in FIG. 3, but this clearance A is a non-circular to form the concaving and convexing portions as described above, so that any dropping therebetween is prevented and thereby the contact sliding of flat cable 3 is smoothly performed.

Also, as described above, if mover 1 is rotated, teeth wheel 6 is rotated by the predetermined angle in contact with the coupling projector. Therefore, the occuring of the error in the forward or revere rotating of flat cable 3 and the breakage or the buckling of flat cable 3 can be prevented by attaching the mark to each of the tooth appointed specially in teeth wheel 6 and the case of positioning mechanism 7.

Figure 5:
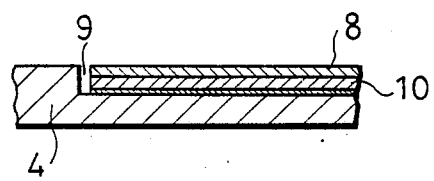
FIG. 5 is a cross-sectional view of the cable reel according to other embodiment of the invention.

FIG. 5 shows other embodiment of this invention. In this embodiment, high sliding sheet 8 is adhesively attached into concaved portion 9 through elastic sheet 10 made of the polyarethane, etc. Thus, the contacting sound of flat cable 3 is reduced due to high sliding sheet 8 deposited on the surface of flat cable 3 and also the encountering shound happened at the time that flat cable 3 is displaced toward the axis line of the rotating barrel 1a is obsorbed by elastic sheet 10 mounted therebetween. Therefore the cable reel, which the deafening roar is largely reduced, is realized.

THE EFFECT OF THE INVENTION

As described above, according to this invention moving toward the diameter of flat cable 3 is becoming smooth by means of the high sliding sheet and thereby this invention can provide the cable reel, which the deafening roar is relatively small.

We claim:

1. A cable reel device, comprising:
   a stationary fixture including a substantially planar surface;
   a rotatable mover mounted on said stationary fixture. said rotatable mover including a planar surface:
   a cylindrical holder member supported on said rotatable mover;
   a sheet of low friction material attached to said substantially planar surface of said stationary fixture: and
   a flat cable wound around said cylindrical holder member with said flat cable positioned such that one edge of said flat cable contacts said sheet of low friction material.

2. A cable reel device as recited in claim 1, wherein said stationary fixture includes a concave portion with a plurality of concave portion projections.

3. A cable reel device as recited in claim 2, wherein said sheet of low friction material includes projecting portions on its outer periphery, said projecting portions being adapted to fit within said concave portion projections of said stationary fixture.

4. A cable reel device as recited in claim 1, wherein a resilient elastic sheet of material is interposed between said sheet of low friction material and said stationary fixture.

5. A cable reel device as recited in claim 1, wherein a sheet of low friction material is attached to said planar surface of said rotatable mover to permit the other edge of said flat cable to move freely when contacting said low friction material attached to said rotatable mover.

6. A cable reel device as recited in claim 5, wherein said rotatable mover includes a concave portion with a plurality of concave portion projections.

7. A cable reel device as recited in claim 6, wherein said sheet of low friction material attached to said rotatable mover includes projecting portions on its outer periphery, said projection portions being adapted to fit within said concave portion projections of said rotatable mover.

8. A cable reel device as recited in claim 5, wherein a resilient elastic sheet of material is interposed between said sheet of low friction material and said rotatable mover.

* * * * *

UNITED STATES PATENT AND TRADEMARK OFFICE
CERTIFICATE OF CORRECTION

PATENT NO. : 4,921,428
DATED : May 1, 1990
INVENTOR(S) : Kunihiko Sasaki et al.

It is certified that error appears in the above-identified patent and that said Letters Patent is hereby corrected as shown below:

Title page, item [75]:

Inventor - "Shinroaku" should read --Shinraku--

Abstract should read:

A cable reel which is a cylindrical housing for a flat cable or transmission line used in transmitting signals between a rotatable mover member, in conjunction with, for example, an automobile steering wheel and a fixed fixture member, for example, stationarily mounted on an automobile steering column. The flat cable, which is wound around an internal cylindrical holder, is loosened and tightened as the steering wheel of an automobile is turned. A sheet of low frictional characteristics is attached to at least one of the inner planar surfaces of the cylindrical housing and lubricates the contact made between the edges in the width direction of the flat cable and the inner planar surface of the housing. Preferably, an elastic sheet with resilient characteristics is sandwiched between the sheet of low frictional characteristics and an inner planar surface of the cylindrical cable housing to absorb and reduce vibrational and frictional sound as well.

UNITED STATES PATENT AND TRADEMARK OFFICE
CERTIFICATE OF CORRECTION

PATENT NO. : 4,921,428

DATED : May 1, 1990

INVENTOR(S) : Kunihiko Sasaki, et al.

It is certified that error appears in the above-identified patent and that said Letters Patent is hereby corrected as shown below:

In such an arrangement, the frictional and vibrational noise that would otherwise accompany the tightening and loosening of the flat cable as the steering wheel is turned is absorbed and therefore significantly reduced.

Signed and Sealed this

Twenty-first Day of July, 1992

Attest:

DOUGLAS B. COMER

Attesting Officer        Acting Commissioner of Patents and Trademarks

Disclaimer 4,921,428—Kunihiko Sasaki; Yuichi Ida; Tsumoru Oka; Mituaki Shinroaku, all of Miyagi, Japan. CABLE REEL. Patent dated May 1, 1990. Disclaimer filed July 16, 2001, by the assignee, Alps Electric Co., Ltd.
Hereby enter this disclaimer to claims 1 thru 8.

*(Official Gazette, December 25, 2001)*

Disclaimer 4,921,428 — Kunihiko sasaki; Yuichi Ida; Tsumoru Oka; Mituaki Shinroaku, all of Miyagi, Japan.CABLE REEL.Patent dated May 1, 1990.Disclaimer filed July 16, 2001, by assignee, Alps Electric Co., Ltd.
Hereby enter this disclaimer to claims 1 thru 8.

*(Official Gazette, January 8, 2002)*